(12) United States Patent
Byagowi et al.

(10) Patent No.: US 11,848,749 B1
(45) Date of Patent: Dec. 19, 2023

(54) SYSTEMS AND METHODS FOR SMOOTH TRANSITIONS BETWEEN TIME SERVERS

(71) Applicant: Meta Platforms, Inc., Menlo Park, CA (US)

(72) Inventors: Ahmad Byagowi, Mountain View, CA (US); Hans-Juergen Schmidtke, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/710,284

(22) Filed: Mar. 31, 2022

(51) Int. Cl.
*H04J 3/00* (2006.01)
*H04J 3/06* (2006.01)

(52) U.S. Cl.
CPC .......... *H04J 3/0676* (2013.01); *H04J 3/0658* (2013.01); *H04J 3/0679* (2013.01)

(58) Field of Classification Search
CPC ...... H04J 3/0635; H04J 3/0667; H04J 3/0638; H04J 3/0647; H04J 3/0664; H04J 3/0682; H04J 3/0661
USPC ......................................................... 370/507
See application file for complete search history.

(56) References Cited

U.S. PATENT DOCUMENTS

| 10,820,292 | B1 * | 10/2020 | Peter ....................... H04W 4/46 |
| 11,068,020 | B2 * | 7/2021 | Handa ................ H04N 21/4305 |
| 2011/0207472 | A1 * | 8/2011 | Abraham ............... A47G 33/00 455/456.1 |
| 2014/0068316 | A1 * | 3/2014 | Hashimoto ............... G06F 1/08 327/156 |
| 2017/0222744 | A1 * | 8/2017 | Huang .................. H04J 3/0667 |

FOREIGN PATENT DOCUMENTS

WO     WO-2022083638 A1 *  4/2022     ............... G09G 3/20

\* cited by examiner

*Primary Examiner* — Robert J Lopata
(74) *Attorney, Agent, or Firm* — Greenberg Traurig, LLP

(57) ABSTRACT

The disclosed computer-implemented method may include systems for optimizing a network environment that is synchronized with a precise time source. For example, a disclosed system can increase the accuracy and efficiency of the network environment with a method for smoothly handing off synchronization control within a group of time servers, each projecting a precise time. Additionally, another disclosed system can further increase the accuracy and efficiency of the network environment with a method for optimizing the latencies of the network environment when scheduling and routing tasks among the network environment members. Various other methods, systems, and computer-readable media are also disclosed.

20 Claims, 8 Drawing Sheets

SYSTEMS AND METHODS FOR SMOOTH TRANSITIONS BETWEEN TIME SERVERS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
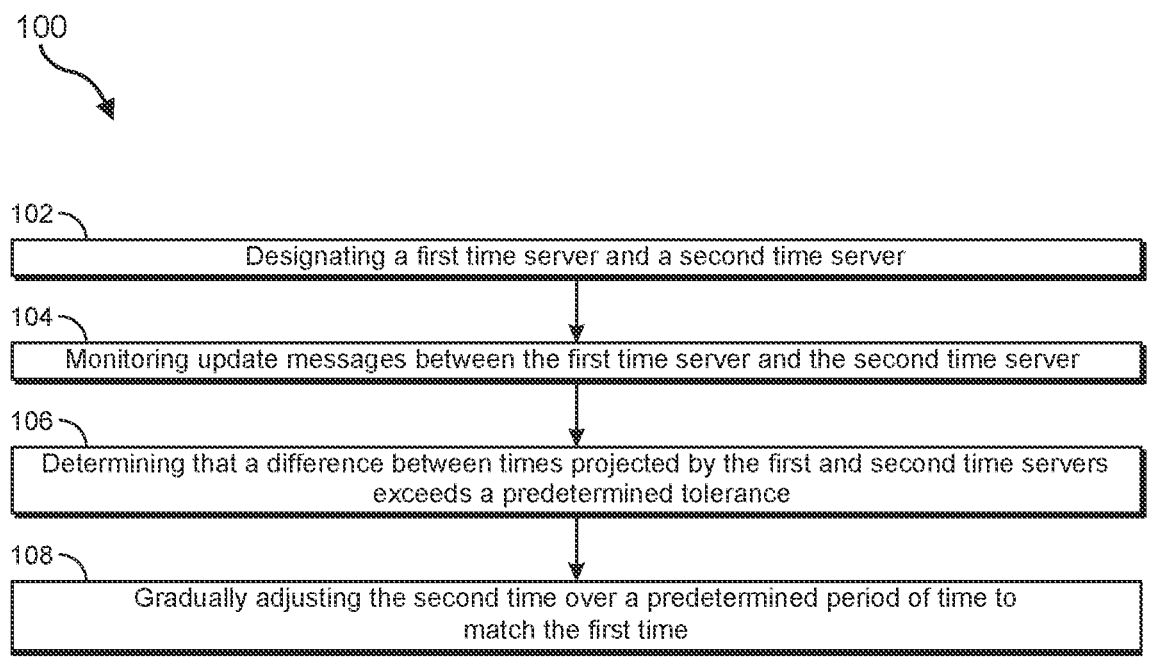
FIG. 1 is a flow diagram of an exemplary computer-implemented method for smoothly transitioning from a first time server to a second time server in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Efficiently scheduling and routing tasks among computing devices within a network environment has become increasingly important within distributed systems. For example, some example implementations can include a controller that assigns and routes tasks among other members of a network environment. Typically, such a controller may assign tasks one-by-one, waiting for a first task to be completed before assigning a second task.

This method of handling computational work, however, suffers in the face of common latencies that exist within network environments. For example, network environments typically include latencies related to the capabilities of individual computing devices (e.g., affected by processing speed, RAM availability and so forth) as well as latencies related to time-of-flight between computing devices within the network environment. To illustrate, a typical controller can assign tasks based on availability—assigning a next task in the list to the first computing device within the network to signal availability for completing that task. This method can often give rise to increased latencies because, for example, the next available computing device may be located far from the assigning device, and/or the next available computing device may have a slower processor.

In an effort to counteract these latencies, example network control systems can attempt to synchronize the system clocks of the computing devices within the network environment. For example, example controllers can assign a main or master computing device to project its system time to other computing devices within the network. The other computing devices, in turn, may alter their own system clocks to match that of the master computing device. In some implementations, network environments may include a dedicated time server. For example, the other computing devices within the network environment may periodically synchronize their system clocks to the time projected by the time server. Following this, the controller may be able to nominally improve the efficiency of the network environment due to the synchronized system clocks.

Despite this, problems can still arise within the network environment because of 1) the speed with which typical computers operate, and 2) how quickly tasks must be completed within the network environment. For example, most computing device clocks (e.g., systems clocks, time server clocks) only extend to milliseconds (ms). Within typical network environments, computing devices can generally complete tasks within much shorter time spans than a millisecond. Put another way, latencies can arise when members of the network environment are only synchronized to the millisecond, but they can complete tasks in microseconds ($\mu s$) or even nanoseconds (ns). Given these timing inefficiencies in light of typical controllers' serial queueing of network tasks, example network environments can suffer from slow-downs, bottlenecks, data loss, and other problems.

Moreover, additional problems may arise when a network environment includes a time server. For example, a network environment may experience backups and data loss when a single time server within that network environment either crashes or goes offline for maintenance. While some network environments may include two or more time servers to guard against this possibility, each individual time server may project a different time because each internal clock behaves independently and may experience swings of plus or minus many microseconds. Thus, transitioning from a first time server to a second time server (i.e., in the event of one server crashing or needing to go offline) can lead to routing inaccuracies within the network environment because the operational margin between the first and second time servers often results in a higher stepping error during the transition. To illustrate, a switch between a first time server and a second time server may result in synchronized computing devices within the same network environment experiencing a sudden jump in synchronized time. As such, example network environments may often experience inaccuracies and inefficiencies due to imprecise time synchronization and/or stepping errors during time server transitions.

Accordingly, the present disclosure is generally directed to systems and methods for smooth transitions between time servers. For example, implementations described herein include a server handoff system that may detect time discrepancies with fine granularity (e.g., at the microsecond level) between times projected by time servers within a time server group. In one or more implementations, the server handoff system can gradually correct a time projected by a second time server to match a time projected by a first time server such that timing control can transition to the second time server with little to no stepping error. As a result, computing devices within the corresponding network environment may continue routing and completing tasks uninterrupted thereby improving the accuracy and efficiency of the network environment.

As discussed above, example time synchronization systems suffer from various technical problems related to the functionality of a computing system. In one or more implementations, the server handoff system can solve these and other technical issues by accurately and efficiently eliminates discrepancies between precision time servers at a highly granular level without introducing a stepping error. By eliminating these minute discrepancies, the server handoff system can increase the accuracy and efficiency of the one or more routing controllers of the network environment within which the precision time servers reside. For example, without the sudden jump caused by switching between time servers that are projecting different times (e.g., common to example systems), the server handoff system may ensure that computing devices that are synchronized to a first time server can avoid data loss, bottle necks, etc. when those same computing device become synchronized with a second time server.

Additionally, the present disclosure is generally directed to systems and methods for improving the efficiency of scheduling and routing tasks within a network environment. For example, implementations described herein include a latency optimization system that may synchronize computing devices within a network environment to one or more precise (e.g., to the nanosecond level) time servers. As will be explained in greater detail below, the latency optimization system may leverage this ultra-precise time synchronization to determine latencies of individual computing devices within the network environments, as well as route latencies in between the individual computing devices. In one or more implementations, the latency optimization system may further utilize these determined latencies to computationally model the network environment such that the latency optimization system may schedule and route additional tasks accurately and efficiently.

As discussed above, example routing systems suffer from various technical problems related to the functionality of a computing system. In one or more implementations, the latency optimization system can solve these and other issues by improving the accuracy of task scheduling and routing within a network environment. For example, the latency optimization system can generate highly accurate routing schedules of tasks within a network environment because the latency optimization system utilizes highly granular and precise time (e.g., projected by a precision time server). The latency optimization system can, in turn, then ensure that computing resources are not wasted as a result of network environment latencies.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
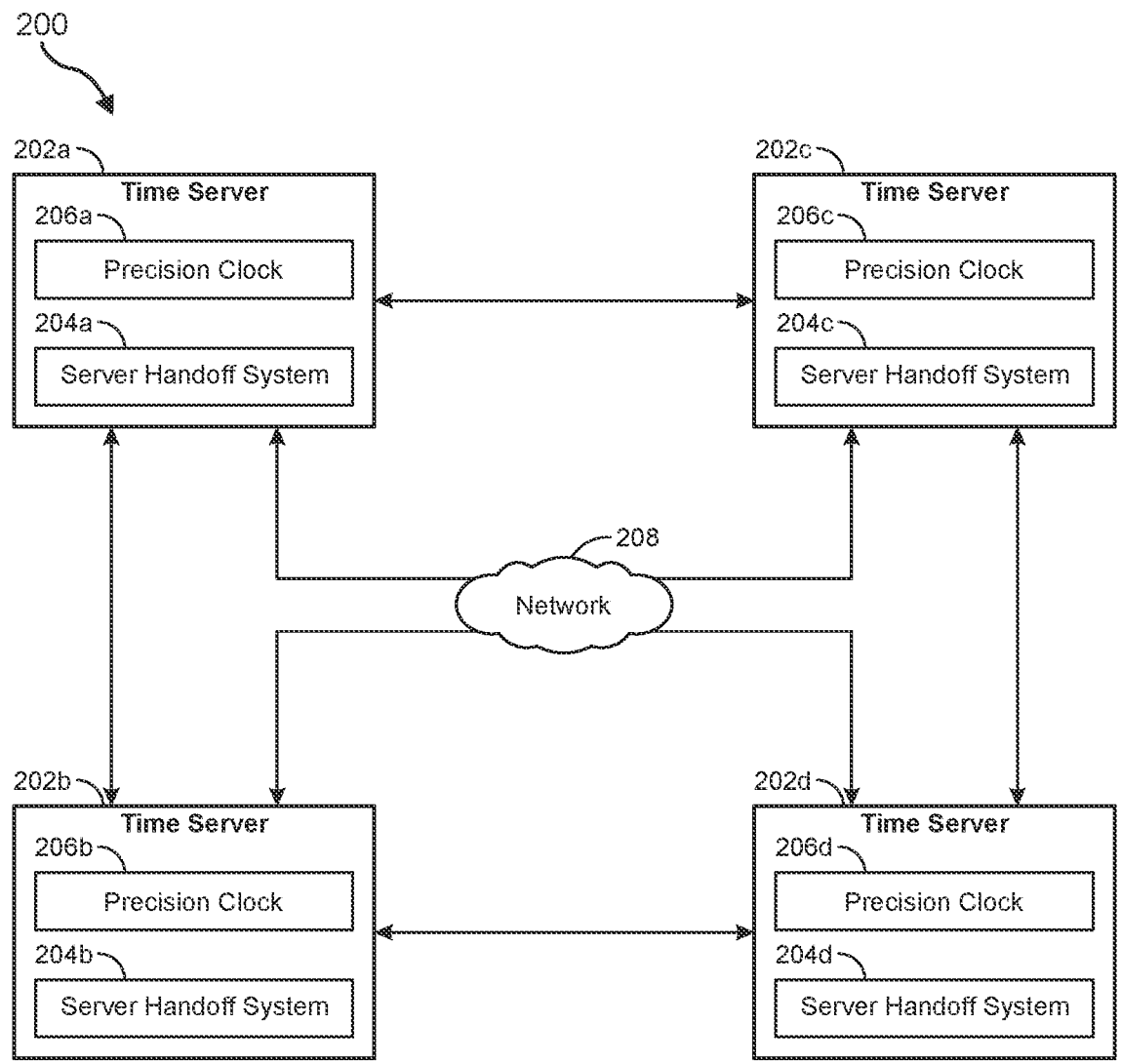
FIG. 2 is a diagram of an environment in which a server handoff system may operate in accordance with one or more implementations.
Figure 3:
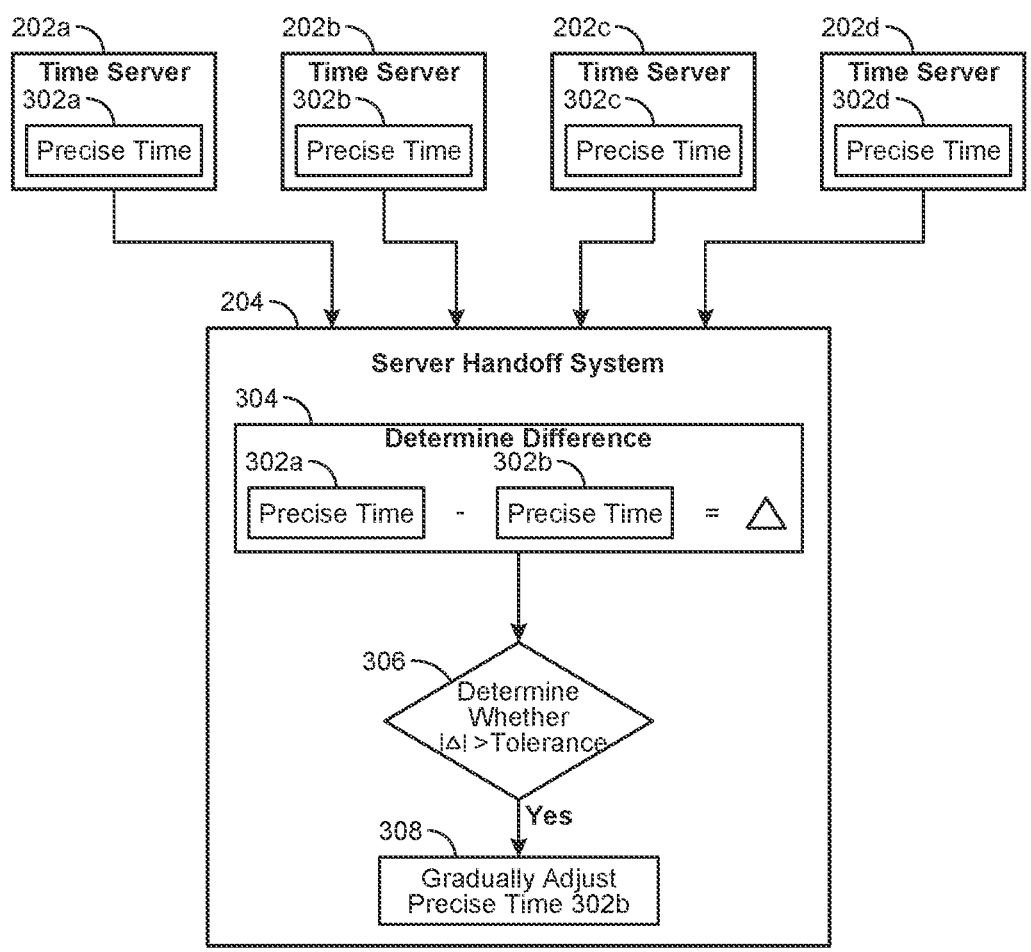
FIG. 3 is a sequence diagram of the server handoff system determining a difference between times projected by a first time server and a second time server in accordance with one or more implementations.
Figure 4:
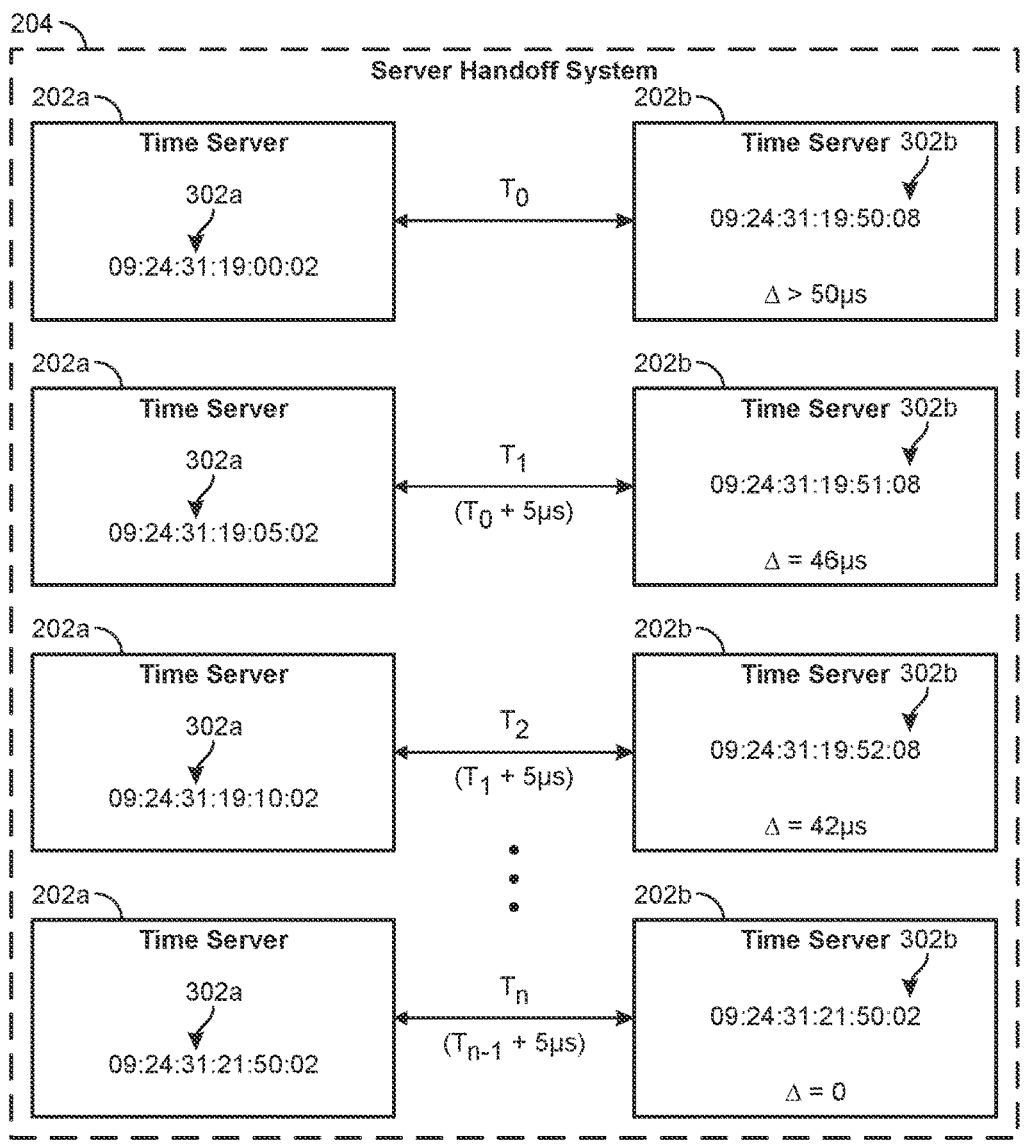
FIG. 4 is a sequence diagram of the server handoff system gradually adjusting a time of a second time server to correspond with a time of a first time server in accordance with one or more implementations.
Figure 5:
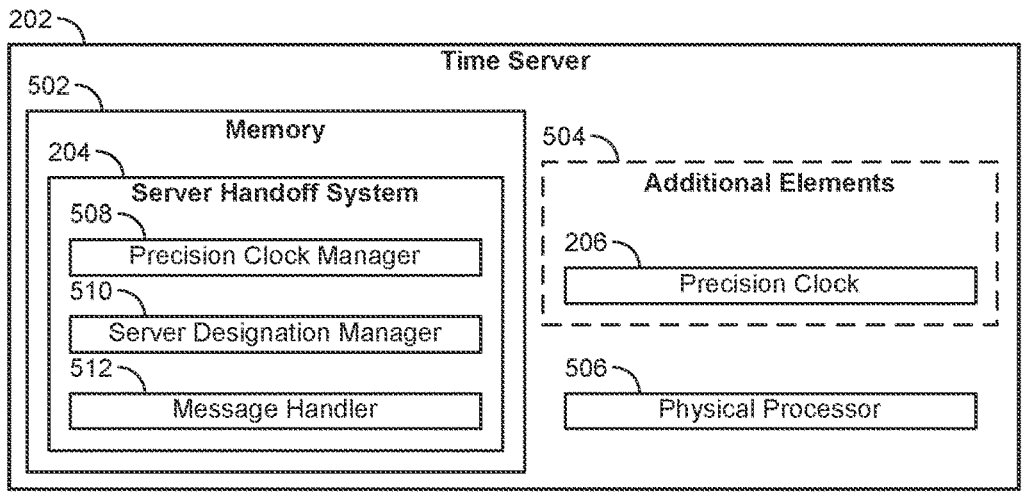
FIG. 5 is a detailed diagram of the server handoff system in accordance with one or more implementations.

The following will provide, with reference to FIGS. 1-9, detailed descriptions of the server handoff system and the latency optimization system. For example, FIGS. 1-5 are associated with the server handoff system, while FIGS. 6-9 are associated with the latency optimization system. In more detail, FIG. 1 is a flow diagram of an exemplary computer-implemented method for smoothly transitioning from a first time server to a second time server. FIG. 2 includes a diagram of an environment in which the server handoff system may operate. FIG. 3 is a sequence diagram of the server handoff system determining a difference between times projected by a first time server and a second time server. FIG. 4 is a sequence diagram of the server handoff system gradually adjusting a time of a second time server to correspond with a time of a first time server. FIG. 5 is a detailed diagram of the server handoff system.

Figure 6:
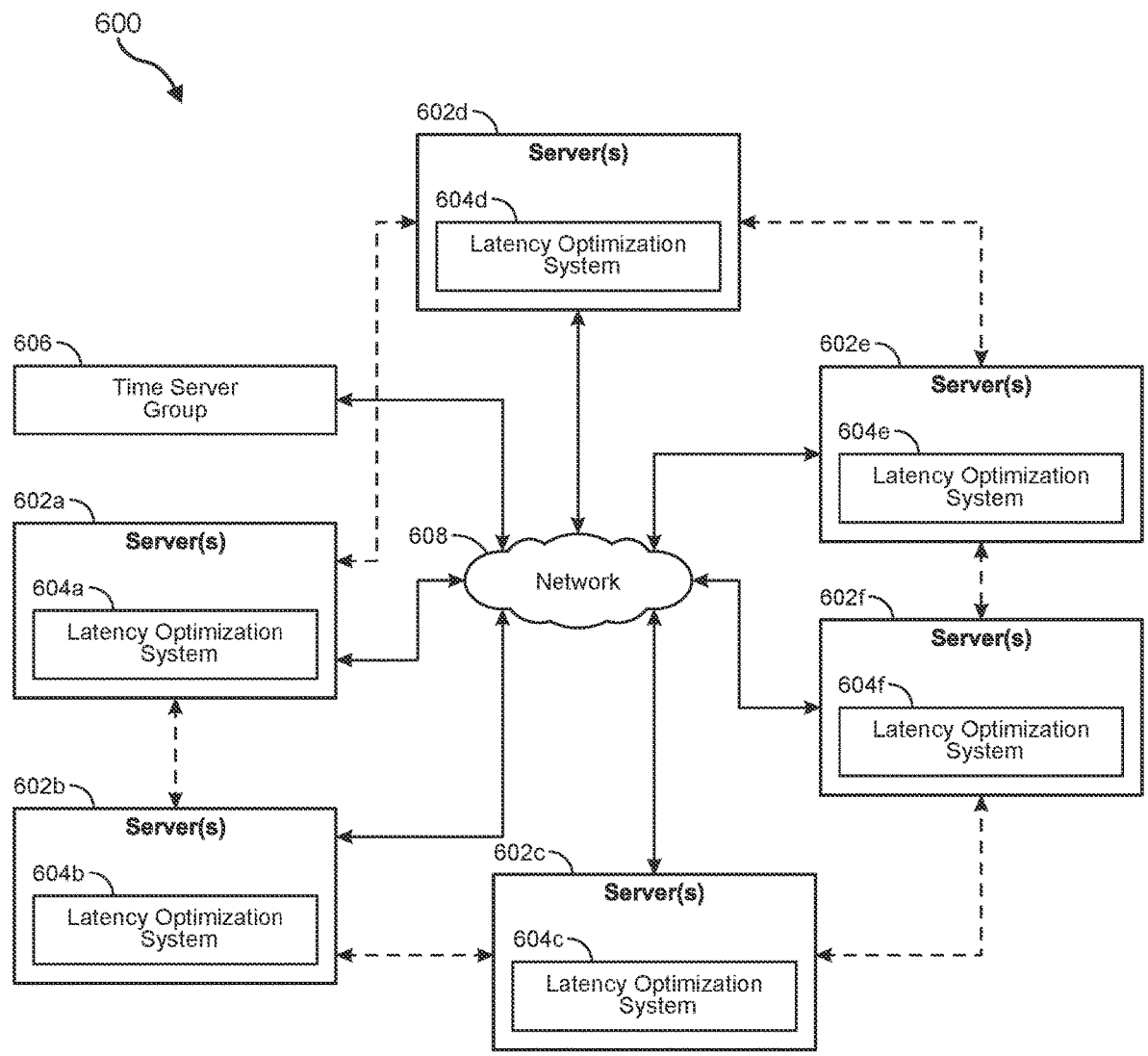
FIG. 6 is a diagram of an environment in which a latency optimization system may operate in accordance with one or more implementations.
Figure 7:
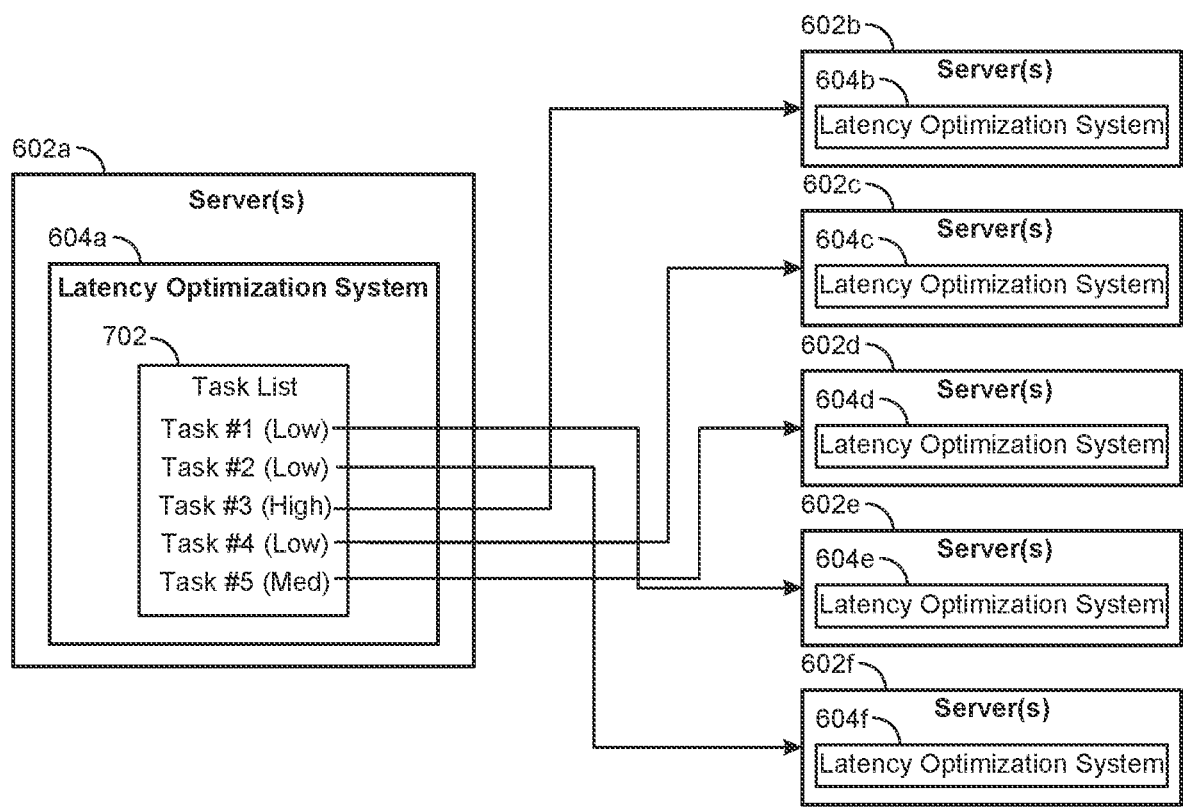
FIG. 7 is a sequence diagram of the latency optimization system in a centralized mode in accordance with one or more implementations.
Figure 8:
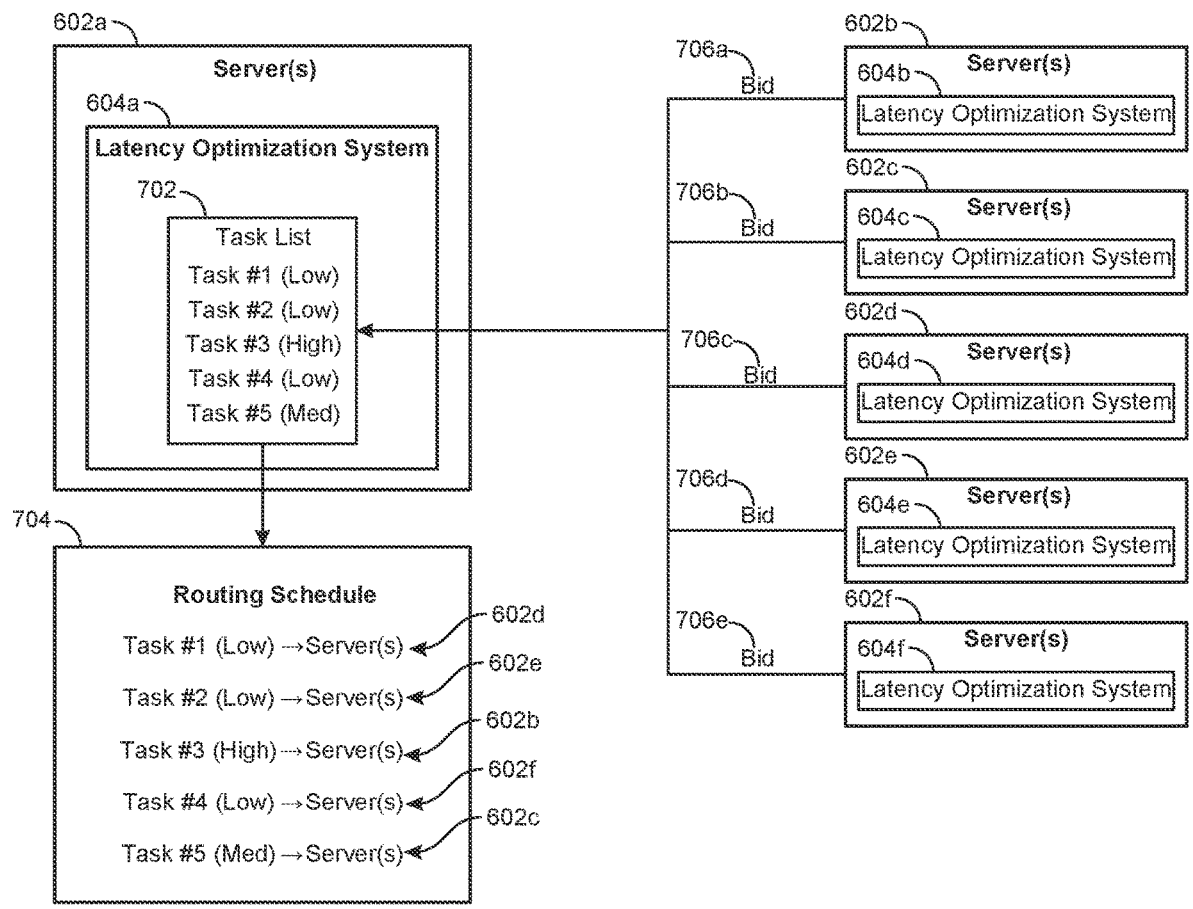
FIG. 8 is a sequence diagram of the latency optimization system in a decentralized mode in accordance with one or more implementations.
Figure 9:
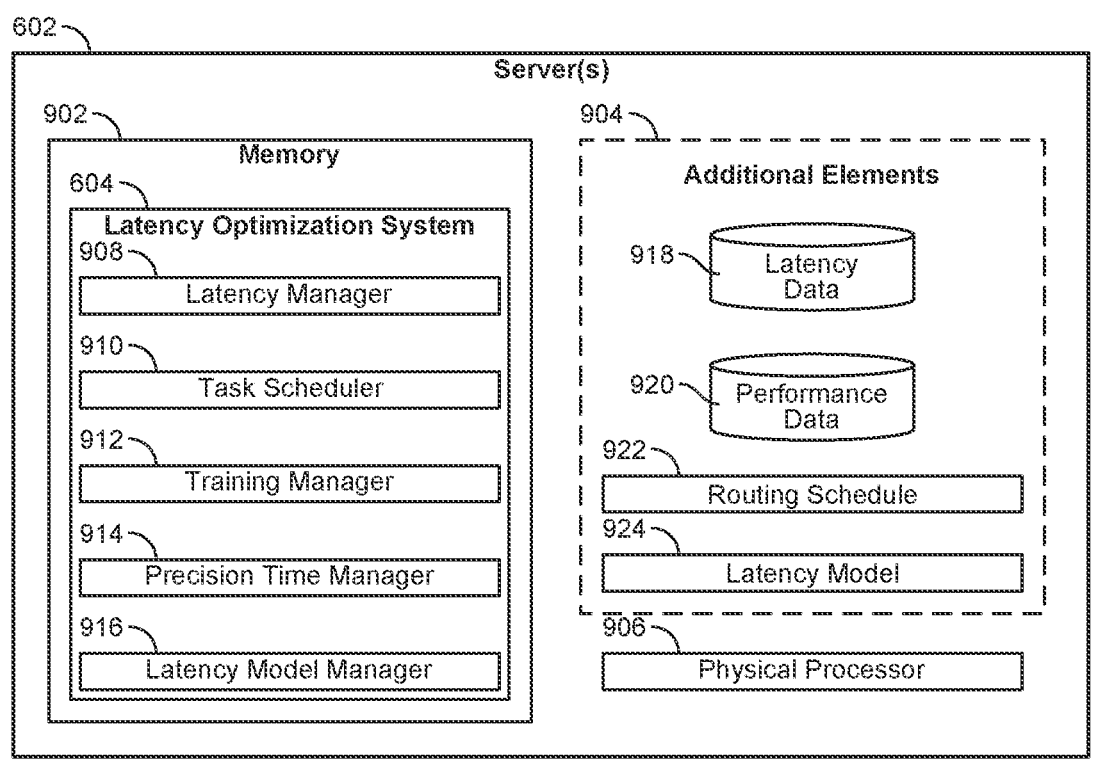
FIG. 9 is a detailed diagram of the latency optimization system in accordance with one or more implementations.

Additionally, FIG. 6 is a diagram of an environment in which the latency optimization system may operate. FIG. 7 is a sequence diagram of the latency optimization system in a centralized mode. FIG. 8 is a sequence diagram of the latency optimization system in a decentralized mode. Finally, FIG. 9 is a detailed diagram of the latency optimization system.

As mentioned above, FIG. 1 is a flow diagram of an exemplary computer-implemented method 100 for gradually adjusting the time of a second time server to match the time of a first time server, thereby enabling a smooth transition between time servers. The steps shown in FIG. 1 may be performed by any suitable computer-executable code and/or computing system, including the system(s) illustrated in FIG. 5. In one example, each of the steps shown in FIG. 1 may represent an algorithm whose structure includes and/or is represented by multiple sub-steps, examples of which will be provided in greater detail below.

As illustrated in FIG. 1, at step 102 one or more of the systems described herein may designate a first time server and a second time server. For example, in some implementations, a network environment may include two or more time servers. As will be discussed in greater detail below, the server handoff system can designate a primary or master time server (i.e., a first time server) to project a precise time to the computing devices within the network environment. In at least one implementation, the server handoff system can designate any additional time servers (e.g., a second time server, a third time server) as backup time servers. Accordingly, the server handoff system can designate a first time server and a second time server among the two or more time servers by instructing a primary time server (e.g., the first time server) to provide update messages projecting a precise time from a clock of the primary time server to the other computing devices within the network environment, while instructing a secondary or slave time server (e.g., a second time server) to not provide any update messages to the computing devices within the network environment.

As further illustrated in FIG. 1, at step 104 the server handoff system can monitor update messages between the first time server and the second time server. For example, in one or more implementations, the two or more time servers in the time server group may provide update messages to each other that include the times projected by their internal clocks. Accordingly, the server handoff system may monitor the update messages between the first time server and the second time server by tracking the first precise time projected by the clock of the first time server and the second precise time projected by the clock of the second time server.

Additionally, at step 106 the server handoff system can determine that a difference between the first precise time and the second precise time exceeds a predetermined tolerance. For example, as mentioned above, the server handoff system can identify minute differences between precise times with a high level of granularity. Accordingly, in one example implementation, the server handoff system can determine that the difference between the first precise time and the second precise time exceeds the predetermined tolerance when the difference is at least 50 microseconds.

Moreover, at step 108—and in response to determining that the time difference exceeds the predetermined tolerance—the server handoff system can gradually adjust the second precise time of the second time server over a predetermined period of time to match the first precise time of the first time server. For example, in one or more implementations, the server handoff system can adjust the clock of the second time server by minute amounts at regular intervals until the clock of the second time server matches the time projected by the clock of the first time server.

Once the clock of the second time server is completely adjusted, the server handoff system can further perform various additional steps. For example, the server handoff system may instruct the second time server to send update messages to the computing devices within the network environment—thereby synchronizing those computing devices with the second time server, while also instructing the first time server to stop sending its update messages to the computing devices within the network environment. At that point, the first time server may be taken offline for maintenance or the like.

In one or more implementations, the methods and acts performed by the server handoff system reference multiple terms. For example, in some implementations, the term "designate" may refer to assigning a particular role. Examples of designating can include, without limitation, the server handoff system sending a message or command to a time server instructing that time server to project or transmit its precise time to computing devices within a network environment. Another example of designating can include, without limitation, the server handoff system changing a role of one or more time servers within an internal tracking record.

As used herein, an "update message" may refer to an electronic communication generated and transmitted by a computing device. For example, in some implementations, a time server can generate and transmit an update message including, but not limited to, a device identifier and a time indicated by a precision clock on that time server. In one or more implementations, a time server can generate and transmit update messages at regular intervals. Additionally, in some implementations, a time server can generate and transmit update messages in response to receiving an update request from another computing device.

As used herein, the term "gradually adjusting" (e.g., "smearing") may refer to incrementally changing a value over a period of time. For example, in some implementations, the server handoff system can gradually adjust the time of a time server over a predetermined period of time. As mentioned above, the server handoff system can gradually adjust the time of a precision clock of a time server at a highly granular level. For example, in some implementations, the server handoff system may adjust a time of a precision clock at the nanosecond level.

FIG. 2 illustrates an exemplary network environment 200 implementing aspects of the present disclosure. For example, the network environment 200 can include time servers 202a, 202b, 202c, 202d, as well as a network 208. In one or more implementations, the server handoff systems 204a, 204b, 204c, and 204d may function on one or more of the time servers 202a-202d. Additionally, each of the time servers 202a-202d may include a precision clocks 206a, 206b, 206c, and 206d, respectively.

In more detail, as discussed above, the server handoff systems 204a-204d can instruct each of the time servers 202a-202d to generate and transmit update messages including times indicated by the precision clocks 206a-206d. Additionally, the server handoff systems 204a-204d can instruct each of the time servers 202a-202d to receive update messages from each other. Additionally, the server handoff system 204a can instruct one of the time servers 202a-202d to gradually alter the time of its precision clock 206 over a predetermined period of time until the time matches that of another of the time servers 202a-202d.

The time servers 202a-202d may be communicatively coupled to each other through the network 208. The network 208 may represent any type or form of communication network, such as the Internet, and may comprise one or more physical connections, such as a LAN, and/or wireless connections, such as a WAN.

Although FIG. 2 illustrates the time servers 202a-202d operating the server handoff systems 204a-204d, respectively, other implementations are possible. For example, in one implementation, the server handoff system 204 may be installed on a separate server. In that implementation, the server handoff system 204 can perform the same functionality in response to receiving update messages from the time servers 202a-202d and transmitting command messages back to the time servers 202a-202d. Furthermore, in some implementations, the network environment 200 may include a greater or lesser number of time servers. Additionally, in some implementations, the network environment 200 can include additional computing devices that are time-synchronized to at least one of the time servers 202a-202d.

As mentioned above, the server handoff system 204 can adjust the precise time of a clock of one time server to match the precise time of a clock of another time server. FIG. 3 illustrates a detailed diagram of the server handoff system 204 determining that a difference between two precise times of the time servers 202a and 202b exceeds a predetermined tolerance. For example, as shown in FIG. 3, the server handoff system 204 can receive update messages from two or more of the time servers 202a-202d indicating each of the precise times 302a, 302b, 302c, and/or 302d.

In a step 304, the server handoff system 204 can determine which of the received precise times 302a-302d to compare. For example, in one or more implementations, the server handoff system 204 can make this determination based on one or more of server designations, maintenance schedules, and condition monitoring. To illustrate, in one implementation, the server handoff system 204 can determine to compare the precise time 302b to the precise time 302a in response to determining that the time server 202a is designated as the first or master time server and the time server 202b is the second or slave time server. In another implementation, the server handoff system 204 can determine to compare the precise time 302b to the precise time 302a in response to determining that a maintenance schedule indicates that the time server 202a will be taken offline for servicing and that the time server 202b is the backup server for the time server 202a. In yet another implementation, the server handoff system 204 can determine to compare the precise time 302b to the precise time 302a in response to determining that an internal temperature of the time server 202a is above an acceptable level and that the time server 202b is the backup server for the time server 202a. In response to any of these determinations, the server handoff system 204 can determine the difference between the precise time 302a and the precise time 302b (e.g., by subtraction).

Additionally, in a step 306 the server handoff system 204 can determine whether the difference between the two precise times is greater than a predetermined tolerance. For example, the server handoff system 204 can determine whether the absolute value of the difference between the precise time 302a and the precise time 302b is greater than the predetermined tolerance. In one or more implementations, the predetermined tolerance is user defined such that a user of the server handoff system 204 can adjust the predetermined tolerance based on various considerations. In additional implementations, the server handoff system 204 can intelligently adjust the predetermined tolerance. For instance, the server handoff system 204 can set the predetermined tolerance to a higher level (e.g., a difference of at least a greater number of microseconds) when a scheduled maintenance time is approaching. Additionally, the server handoff system 204 can set the predetermined tolerance to a lower level (e.g., a difference of at least a lower number of microseconds) when there are no scheduled maintenance times approaching but the operating conditions of the master time server are becoming unstable.

Moreover, in a step 308 the server handoff system 204 can gradually adjust the precise time 302b to match the precise time 302a. Greater detail is now provided with regard to the step 308 with regard to FIG. 4. For example, as shown in FIG. 4, the server handoff system 204 can gradually adjust the precise time 302b across multiple time steps (e.g., $t_0$, $t_2$ ... $t_n$). In more detail, as shown at the time step $t_0$, there is more than a predetermined tolerance (e.g., 50 μs) between the precise time 302a of the time server 202a and the precise time 302b of the time server 202b. In light of any of the triggering conditions discussed above (e.g., scheduled maintenance, operating conditions outside acceptable parameters) and the precise times 302a, 302b projected by clocks of the first time server 202a and the second time server 202b having a difference that exceeds the predetermined tolerance, the server handoff system 204 can gradually adjust the precise time 302b to match the precise time 302a.

In one or more implementations, the server handoff system 204 can gradually adjust the precise time 302b by changing the clock that projects the precise time 302b by a predetermined amount at each time step until the precise time 302b matches the precise time 302a. For example, in the implementation shown in FIG. 4, the precise time 302b is 50 μs faster than the precise time 302b. Accordingly, in at least one implementation, the server handoff system 204 can gradually adjust the clock of the second time server 202b that projects the precise time 302b by incrementing the second clock projecting the precise time 302b only his for every 5 μs until the precise time 302b matches the precise time 302a. In additional implementations, the server handoff system 204 can increment the second clock projecting the precise time 302b by any predetermined amount at each time step. Furthermore, in additional implementations, the server handoff system 204 can determine the time steps (e.g., $t_0$, $t_1$, etc.) at any predetermined number of microseconds. Moreover, in some implementations, the server handoff system 204 can increment precise time changes and time steps over microseconds, milliseconds, or nanoseconds.

In one or more implementations, the server handoff system 204 can repeat the steps illustrated in FIGS. 3 and 4 with other time servers in the time server group. For example, the server handoff system 204 can further monitor updates messages between the time server 202b and the time server 202c in order to adjust a clock of the time server 202c to match a time projected by the clock of the time server 202b. In this way, the server handoff system 204 can enable a round-robin handoff of timing control among any number of time servers.

FIG. 5 illustrates a block diagram of the server handoff system 204 operating on a time server 202 (e.g., any of the time servers 202a, 202b, 202c, and 202d discussed above). As mentioned, the server handoff system 204 performs many functions in connection with smoothly handing off control among time servers. Accordingly, FIG. 5 provides additional detail with regard to these functions. For example, as shown in FIG. 5, a time server 202 can include a memory 502, additional elements 504, and a physical processor 506. In one or more implementations, the memory 502 may be installed with the server handoff system 204 including a precision clock manager 508, a server designation manager 510, and a message handler 512. Although illustrated as separate elements, one or more of the components 508-512 of the server handoff system 204 may be combined in additional implementations. Similarly, in additional implementations, the server handoff system 204 may include additional, fewer, or different components.

In certain implementations, the server handoff system 204 may represent one or more software applications or programs that, when executed by a computing device, may cause the computing device to perform one or more tasks. For example, and as will be described in greater detail below, one or more of the components 508-512 of the server handoff system 204 may represent software stored and configured to run on one or more computing devices, such as the time servers 202a-202d. One or more of the components 508-512 of the server handoff system 204 shown in FIG. 5 may also represent all or portions of one or more special-purpose computers configured to perform one or more tasks.

As mentioned above, and as shown in FIG. 5, the server handoff system 204 can include the precision clock manager 508. In one or more implementations, the precision clock manager 508 can handle interactions with the precision clock 206. For example, the precision clock manager 508 can request a current time from the precision clock 206. Additionally, the precision clock manager 508 determine that a difference between the time projected by the precision clock 206 and another precision clock exceeds a predetermined tolerance. In light of this determination, the precision clock manager 508 can control the precision clock 206 to gradually alter the time projected by the precision clock 206 (e.g., as discussed above with reference to FIG. 4).

Additionally, and as mentioned above, the server handoff system 204 can include the server designation manager 510. In one or more implementations, the server designation manager 510 can maintain and periodically update designations among a group of time servers. For example, the server designation manager 510 can monitor update messages from each time server within a group of time servers to determine whether time differences between pairs of the time servers exceed a predetermined tolerance. In response to determining that the predetermined tolerance is exceeded between a pair of time servers or detecting another triggering condition (e.g., scheduled maintenance), the server designation manager 510 can instruct the precision clock manager 508 to determine a difference between times projected by a first time server and a second time server and gradually adjust the time of the second time server the predetermined tolerance is exceeded. In response to a notification from the precision clock manager 508 that this task is complete, the server designation manager 510 can redesignate the second time server as the first time server (i.e., redesignate the second time server as the master time server), and can take the previous first time server offline. In one or more implementations, the server designation manager 510 can redesignation time servers in this way by instructing the first time server to cease projecting a precision time to computing devices within the network environment (e.g., the network environment 200 as discussed above with reference to FIG. 2), and further instructing the second time server to between projecting its precision time to the same computing devices. The server designation manager 510 can further instruct the one or more time servers within the group of time servers to update each time servers' designation accordingly.

Moreover, and as mentioned above, the server handoff system 204 can include the message handler 512. In one or more implementations, the message handler 512 can generate and send update messages from the time server 202. The message handler 512 can also receive update messages from other time servers within the group of time servers. For example, the message handler 512 can generate an update message including a precise time (e.g., requested by the precision clock manager 508 from the precision clock 206) as well as the time server 202 designation or ID. The message handler 512 can further transmit this update message to other time servers. Additionally, in response to receiving an update message from another time server, the message handler 512 can provide the received update message to the precision clock manager 508 and/or the server designation manager 510.

As further illustrated in FIG. 5, the time server 202 can store and maintain the server handoff system 204 in the memory 502. The memory 502 generally represents any type or form of volatile or non-volatile storage device or medium capable of storing data and/or computer-readable instructions. In one example, the memory 502 may store, load, and/or maintain one or more of the components 508-512 of the server handoff system 204. Examples of the memory 502 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Also as illustrated in FIG. 5, the time server 202 may also include one or more physical processors, such as a physical processor 506. The physical processor 506 generally represents any type or form of hardware-implemented processing unit capable of interpreting and/or executing computer-readable instructions. In one embodiment, the physical processor 506 may access and/or modify one or more of the components 508-512 of the server handoff system 204. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, as shown in FIG. 5, the time server 202 may also include one or more additional elements 504. For example, in one or more embodiments, the additional elements 504 can include additional data storage including a precision clock 206 (e.g., any of the precision clocks 206a-206d discussed above with regard to FIG. 2). In one or more implementations, the precision clock 206 can include an ultra-precision atomic clock that measures time based on atomic oscillation.

Accordingly, the server handoff system 204 ensure smooth transitions between time servers in a time-synchronized network environment. For example, utilizing any of the features or functionalities discussed above, the server handoff system 204 can anticipate when timing control will need to pass from a master time server to another time server. Prior to this upcoming handoff, the server handoff system 204 can further gradually adjust the clock of a second time server to match the time of the master time server, such that when timing control passes to the second time server any networked computing device becomes synchronized to the second time server experiences little to no stepping error.

As mentioned above, time servers—such as the time servers 202a-202d—often exist in a network environment with other computing devices. For example, in some implementations, such a time server group may exist in a network environment where other computing devices are synchronized to a master time server within the time server group. Also as discussed above, computing devices within such an environment can often suffer from increased latency while completing distributed tasks. In one or more implementations, the latency optimization system mentioned above can utilize the highly precise time projected by the time server group to generate highly accurate routing schedules, thereby reducing network latency. Additional detail with regard to the latency optimization system is now provided.

For example, FIG. 6 illustrates an exemplary network environment 600 implementing aspects of the present disclosure. In one or more implementations, the network environment 600 can include server(s) 602a, 602b, 602c, 602d, 602e, and 602f. In some implementations, each of the server(s) 602a-602f may implement an installation of a latency optimization systems 604a, 604b, 604c, 604d, 604e, or 604f, respectively. Moreover, the network environment 600 can include a time server group 606 (e.g., such as the time servers 202a-202d discussed above), as well as a network 608.

In more detail, any of the server(s) 602a-602f may have distributed tasks for completion among the other server(s) within the network environment 600. For example, the server(s) 602b may have a list of tasks for completion among the other server(s) 602a, and 602c-602f. Under previous example systems, the server(s) 602b may have sent these tasks one-by-one to the other server(s) (e.g., serially)—waiting for one task to be completed before sending out the next. Accordingly, latencies would inevitably arise when, for example, a computationally intensive task was sent to a server that was far away (e.g., the server 602e), and/or to a server with fewer computational resources (e.g., a slow processor, low memory).

The latency optimization system 604a-604f solves these and other problems by leveraging the ultra-precise time projected by a time server from the time server group 606 to accurately determine features of the network environment 600. For example, by leveraging the time server group 606, the latency optimization system 604a-604f can determine time-of-flight between each of the server(s) 602a-602f. For example, in some implementations, some or all of the server(s) 602a-602f may be geographically located in diverse locations. Conversely, in some implementations, some or all of the server(s) 602a-602f may be located within the same data center. Accordingly, transmission times (e.g., time-of-flight) between the server(s) 602a-602f may be shorter when the server(s) 602a-602f are physically closer to each other, or longer when the server(s) 602a-602f are physically farther apart from each other.

Additionally, the latency optimization systems 604a-604f can determine the capabilities of the server(s) 602a-602f to accurately gauge how long each member of the network environment 600 spends in completing different types of tasks. For example, each of the server(s) 602a-602f may have different processing capabilities, different network connection speeds, different memory bandwidth, and so forth. In at least one embodiment, the latency optimization system 604 is able to make these and other determinations with a high degree of accuracy because each of the server(s) 602a-602f are synchronized to at least one time server within the time server group 606.

Accordingly, in one or more implementations, the latency optimization system 604 can utilize the information determined in connection with the network environment 600 to generate and train a latency model of the network environment 600. For example, in one implementation, the latency optimization system 604 can generate the latency model as a convolutional neural network, a recurrent neural network, a multi-layer perceptron, etc. The latency optimization system 604 can further train the latency model on the observed and determined information from the network environment 600. In one or more embodiments, the latency optimization system 604 trains the latency model to optimize scheduling and routing of a list of tasks within the network environment 600 such that the list of tasks will be completed in parallel by the server(s) 602a-602f with greater speed and efficiency.

As mentioned above, the server(s) 602a-602f and the time server group 606 may be communicatively coupled to each other through the network 608. Similarly to the network 208 discussed above with reference to FIG. 2, the network 608 may represent any type or form of communication network, such as the Internet, and may comprise one or more physical connections, such as a LAN, and/or wireless connections, such as a WAN.

Although FIG. 6 illustrates the latency optimization system 604a-604f operating on the server(s) 602a-602f, respectively, other implementations are possible. For example, in one implementations, the latency optimization system 604 may be installed on a single controller server. In another implementation, the latency optimization system 604 may be installed on the time servers within the time server group 606. In another implementation, the latency optimization system 604 may be installed on some, but not all, of the server(s) 602a-602f. Furthermore, in additional implementations, the network environment 600 may include a greater or lesser number of server(s).

In one or more implementations, the latency optimization system 604 may operate in a variety of modes. For example, in some implementations, the latency optimization system 604 may operate in a centralized mode. Additionally, in some implementations, the latency optimization system 604 may operate in a decentralized mode. FIGS. 7 and 8 provide additional detail with regard to the centralized mode and the decentralized mode.

For example, as shown in FIG. 7, the latency optimization system 604 can operate in a centralized mode where one of the server(s) 602a-602f acts as a scheduling controller for the rest of the server(s) within the network environment 600. To illustrate, the latency optimization system 604a on the server(s) 602a can receive a list of tasks. The latency optimization system 604a can further determine how computationally intensive each task is (e.g., low, medium, high).

As mentioned above, the latency optimization system 604a can further receive and/or determine features associated with the other server(s) 602b-602f. For example, leveraging the time synchronized nature of the network environment 600, the latency optimization system 604a can generate and train (or update) a latency model based on these received and/or determined features. In at least one implementation, the latency optimization system 604a can apply the trained latency model to the task list 702 to generate a routing schedule 704. For instance, as shown in FIG. 7, the latency optimization system 604a can route individual tasks to the server(s) indicated by the generated routing schedule 704. Accordingly, by using the optimized routing schedule 704 that accounts for the strengths and weaknesses of the other server(s) within the network environment 600, the latency optimization system 604a can cause the tasks in the task lists to be completed in parallel with greater accuracy and in less time.

Additionally, as shown in FIG. 8, the latency optimization system 604 can operate in a decentralized mode. For example, in the decentralized mode, server(s) within the network environment 600 can bid on tasks based on their own knowledge of their ability within the network environment 600 and current availability. To illustrate, in one or more implementations, the latency optimization system 604a-604f on each of the server(s) 602a-602f can generate and train one or more latency models that output predictions as to how long a task will take the server(s) where each latency model is located.

For example, in response to the latency optimization system 604a broadcasting the task list 702 including tasks requiring different levels of computational intensity, each of the latency optimization systems 604b-604f can apply latency models to the tasks in the task list 702. In at least one implementation, each latency model can output one or more bids relative to the tasks in the list. For instance, in response to receiving the task list, the latency model of the latency optimization system 604b can generate a bid 706a representing an amount of time in which the server(s) 602b can complete one of the tasks on the list.

After receiving one or more bids (e.g., the bids 706a, 706b, 706c, 706d, 706e) from the latency optimization systems 604b-604f, the latency optimization system 604a can generate an updated task list 704 that includes a routing schedule. For example, based on the received bids, the latency optimization system 604a can assign and route each task in the updated task list 704 to a server(s) (e.g., one of the server(s) 602b-602f) that submitted the lowest or best bid for that task. As such, as with the centralized mode discussed above, the latency optimization system 604 can increase the speed and accuracy of task completion in the networked environment 600 by utilizing a bid process when operating in the decentralized mode.

FIG. 9 illustrates a block diagram of the latency optimization system 604 operating on a server(s) 602 (e.g., any of the server(s) 602a-602f discussed above). As mentioned, the latency optimization system 604 performs many functions in connection with leveraging precise time in scheduling and routing tasks among members of a network environment. Accordingly, FIG. 9 provides additional detail with regard to these functions. For example, as shown in FIG. 9, the server(s) 602 can include a memory 902, additional elements 904, and a physical processor 906. In one or more implementations, the memory 902 may be installed with the latency optimization system 604 including a latency manager 908, a task scheduler 910, a training manager 912, a precision time manager 914, and a latency model manager 916. Although illustrated as separate elements, one or more of the components 908-916 of the latency optimization system 604 may be combined in additional implementations.

Similarly, in additional implementations, the latency optimization system 604 may include additional, fewer, or different components.

In certain implementations, the latency optimization system 604 may represent one or more software applications or programs that, when executed by a computing device, may cause the computing device to perform one or more tasks. For example, and as will be described in greater detail below, one or more of the components 908-916 of the latency optimization system 604 may represent software stored and configured to run on one or more computing devices, such as the server(s) 602a-602f. One or more of the components 908-916 of the latency optimization system 604 shown in FIG. 9 may also represent all or portions of one or more special-purpose computers configured to perform one or more tasks.

As mentioned above, and as shown in FIG. 9, the latency optimization system 604 can include the latency manager 908. In one or more implementations, the latency manager 908 can utilize a precise time provided by a time server (e.g., a time server from the time server group 606) to determine latencies within a network environment (e.g., the network environment 600) relative to the server(s) 602. For example, the latency manager 908 can determine how long messages from the server(s) 602 take to get to other members of the network environment. Additionally, the latency manager 908 can determine how long it takes for messages from other members of the network environment to arrive at the server(s) 602. Moreover, the latency manager 908 can determine capabilities of the server(s) 602 in order to gauge or predict task completion times.

Additionally, as shown in FIG. 9, the latency optimization system 604 can include the task scheduler 910. In one or more embodiments, the task scheduler 910 can generate a routing schedule associated with a list of tasks based on the latencies identified and determined by the latency manager 908. For example, in the centralized mode, the task scheduler 910 can generate a routing schedule for sending tasks to other members of the network environment based on predictions from a latency model maintained on the server(s) 602. In the decentralized mode, the task scheduler 910 can generate a routing schedule based on bids received from the other members of the network environment. In some implementations, the task scheduler 910 can also transmit tasks to other members of the network environment according to the generated routing schedule.

Furthermore, as mentioned above, the latency optimization system 604 can also include the training manager 912. In one or more implementations, the training manager 912 collects training data and trains one or more latency models. For example, the training manager 912 can collect training data including latency data 918 and performance data 920. As discussed above, latency data 918 can include time of flight information between members of the network environment. Additionally performance data 920 can include information associated with the computational capabilities of the members of the network environment. In at least one implementation, the training manager 912 can utilize this data to train a latency model 924 via any appropriate neural network training methodology (e.g., feed-forward back-propagation).

As mentioned above, the latency optimization system 604 can further include the precision time manager 914. In one or more implementations, the precision time manager 914 can perform the tasks involved in keeping the server(s) 602 synchronized with a precision time source. For example, the precision time manager 914 can regularly request and/or receive a precision time projected by a time server from the time server group 606. In some embodiments, the precision time manager 914 can also update a system clock or other similar timekeeping module of the server(s) 602 to match the precision time.

Moreover, as shown in FIG. 9, the latency optimization system 604 can also include the latency model manager 916. In one or more implementations, the latency model manager 916 generates predictions by applying the latency model 924 to input data. For example, the latency model manager 916 can generate an input vector based on input data (e.g., a task list and/or task bids). The latency model manager 916 can further format one or more outputs of the latency model 924 into routing schedule.

As further illustrated in FIG. 9, the server(s) 606 can store and maintain the latency optimization system 604 in the memory 902. The memory 902 generally represents any type or form of volatile or non-volatile storage device or medium capable of storing data and/or computer-readable instructions. In one example, the memory 902 may store, load, and/or maintain one or more of the components 908-916 of the latency optimization system 604. Examples of the memory 902 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Also as illustrated in FIG. 9, the server(s) 602 may also include one or more physical processors, such as a physical processor 906. The physical processor 906 generally represents any type or form of hardware-implemented processing unit capable of interpreting and/or executing computer-readable instructions. In one embodiment, the physical processor 906 may access and/or modify one or more of the components 908-916 of the latency optimization system 604. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, as shown in FIG. 9, the server(s) 602 may also include one or more additional elements 904. For example, in one or more embodiments, the additional elements 904 can include additional data storage including latency data 918, performance data 920, one or more routing schedules 922, and one or more latency models 924, as discussed above.

As such, and in combination with the server handoff system 204 discussed above, the latency optimization system 604 increase the accuracy and efficiency of computing devices within a network environment by leveraging precise time in connection with optimized routing schedules. For example, by leveraging precise time within the network environment, the latency optimization system 604 can precisely identify latencies within the network environment. The latency optimization system 604 can train a computational model on these latencies such that the computational model can then optimize a routing schedule of tasks. Ultimately, utilizing the optimized routing schedule, the latency optimization system 604 can cause the computing devices within the network environment to complete a list of tasks in a manner that is faster and more accurate than was previously possible.

Example Embodiments

Example 1: A computer-implemented method for smoothly transitioning between time servers. For example, the method may include designating a first time server and a second time server, wherein the first time server operates a first clock and the second time server operates a second clock; monitoring update messages between the first time server and the second time server indicating times projected by the first clock and the second clock; determining, based on the update messages, that a difference between the times projected by the first clock and the second clock exceeds a predetermined tolerance; and in response to determining that the difference between the times exceeds the predetermined tolerance, gradually adjusting the second clock of the second time server over a predetermined period of time to match the time projected by the first clock of the first time server.

Example 2: The computer-implemented method of Example 1, wherein determining that the difference between the times projected by the first clock and the second clock exceed the predetermined tolerance comprises determining that the difference between the times projected by the first clock and the second clock is at least 50 microseconds.

Example 3: The computer-implemented method of any of Examples 1 and 2, wherein gradually adjusting the second clock to match the time projected by the first clock comprises, at every predetermined number of microseconds, changing the time projected by the second clock by a predetermined amount until the time projected by the second clock matches the time projected by the first clock.

Example 4: The computer-implemented method of any of Examples 1-3, wherein monitoring the update messages between the first time server and the second time server comprises receiving the update messages from the first time server and the second time server every second.

Example 5: The computer-implemented method of any of Examples 1-4, further comprising: designating a third time server operating a third clock; monitoring update messages between the second time server and the third time server indicating times projected by the second clock and the third clock; determining that a difference between the time projected by the second clock and the third clock exceed the predetermined tolerance; and in response to determining that the difference between the time projected by the second clock and the third clock exceeds the predetermined tolerance, gradually adjusting the third clock of the third time server over the predetermined period of time to match the time projected by the second clock of the second time server.

Example 6: The computer-implemented method of any of Examples 1-5, further comprising, in response to gradually adjusting the second clock of the second time server over a predetermined period of time to match the time projected by the first clock of the first time server: redesignating the first time server as the second time server; and redesignating the second time server as the first time server.

Example 7: The computer-implemented method of any of Examples 1-6, wherein monitoring update messages between the first time server and the second time server is in response to a maintenance schedule indicating that the first time server will be taken offline within a threshold amount of time.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive update messages and other data within a network environment, transform or modify time server clocks, routing schedules, and so forth, output a result of the transformation or modification to increase the accuracy and efficiency of computational operations within the network environment, use the result of the transformation or modification to increase the accuracy and efficiency of computational operations within the network environment, and store the result of the transformation or modification to increase the accuracy and efficiency of computational operations within the network environment. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magneticstorage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    designating, within a network environment, a first time server and a second time server, wherein the first time server operates a first clock and the second time server operates a second clock and wherein one or more computing devices within the network environment are synchronized to the first clock of the first time server;
    monitoring update messages between the first time server and the second time server indicating times projected by the first clock and the second clock;
    determining, based on the update messages, that a difference between the times projected by the first clock and the second clock exceeds a predetermined tolerance;
    in response to determining that the difference between the times exceeds the predetermined tolerance, gradually adjusting the second clock of the second time server by a predetermined amount of time in each of multiple equal time intervals within a predetermined period of time to match the time projected by the first clock of the first time server; and
    in response to gradually adjusting the second clock of the second time server to match the time projected by the first clock of the first time server, re-synchronizing the one or more computing devices within the network environment to the second clock of the second time server.

2. The computer-implemented method of claim 1, wherein determining that the difference between the times projected by the first clock and the second clock exceed the predetermined tolerance comprises determining that the difference between the times projected by the first clock and the second clock is at least 50 microseconds.

3. The computer-implemented method of claim 1, wherein the equal time intervals each comprise a predetermined number of microseconds.

4. The computer-implemented method of claim 1, wherein monitoring the update messages between the first time server and the second time server comprises receiving the update messages from the first time server and the second time server every second.

5. The computer-implemented method of claim 1, further comprising:
    designating a third time server operating a third clock;
    monitoring update messages between the second time server and the third time server indicating times projected by the second clock and the third clock;
    determining that a difference between the time projected by the second clock and the third clock exceed the predetermined tolerance;
    in response to determining that the difference between the time projected by the second clock and the third clock exceeds the predetermined tolerance, gradually adjusting the third clock of the third time server over the predetermined period of time to match the time projected by the second clock of the second time server; and
    re-synchronizing the one or more computing devices within the network environment to the third clock of the third time server.

6. The computer-implemented method of claim 1, further comprising, in response to gradually adjusting the second clock of the second time server over a predetermined period of time to match the time projected by the first clock of the first time server:
    redesignating the first time server as the second time server; and
    redesignating the second time server as the first time server.

7. The computer-implemented method of claim 1, wherein gradually adjusting the second clock of the second time server is in response to a maintenance schedule indicating that the first time server will be taken offline within a threshold amount of time.

8. A system comprising:
    at least one physical processor; and
    physical memory comprising computer-executable instructions that, when executed by the at least one physical processor, cause the at least one physical processor to perform acts comprising:
    designating, within a network environment, a first time server and a second time server, wherein the first time server operates a first clock and the second time server operates a second clock and wherein one or more computing devices within the network environment are synchronized to the first clock of the first time server;
    monitoring update messages between the first time server and the second time server indicating times projected by the first clock and the second clock;
    determining, based on the update messages, that a difference between the times projected by the first clock and the second clock exceeds a predetermined tolerance;
    in response to determining that the difference between the times exceeds the predetermined tolerance, gradually adjusting the second clock of the second time server by a predetermined amount of time in each of multiple equal time intervals within a predetermined period of time to match the time projected by the first clock of the first time server; and in response to gradually adjusting the second clock of the second time server to match the time projected by the first clock of the first time server, re-synchronizing the one or more computing devices within the network environment to the second clock of the second time server.

9. The system of claim 8, wherein determining that the difference between the times projected by the first clock and the second clock exceed the predetermined tolerance comprises determining that the difference between the times projected by the first clock and the second clock is at least 50 microseconds.

10. The system of claim 8, wherein the equal time intervals each comprise a predetermined number of microseconds.

11. The system of claim 8, wherein monitoring the update messages between the first time server and the second time server comprises receiving the update messages from the first time server and the second time server every second.

12. The system of claim 8, wherein the physical memory comprises computer executable instructions that, when executed by the at least one physical processor, cause the at least one physical processor to further perform acts comprising:

designating a third time server operating a third clock;

monitoring update messages between the second time server and the third time server indicating times projected by the second clock and the third clock;

determining that a difference between the time projected by the second clock and the third clock exceed the predetermined tolerance;

in response to determining that the difference between the time projected by the second clock and the third clock exceeds the predetermined tolerance, gradually adjusting the third clock of the third time server over the predetermined period of time to match the time projected by the second clock of the second time server; and re-synchronizing the one or more computing devices within the network environment to the third clock of the third time server.

13. The system of claim 8, wherein the physical memory comprises computer executable instructions that, when executed by the at least one physical processor, cause the at least one physical processor to further perform an acts comprising, in response to gradually adjusting the second clock of the second time server over a predetermined period of time to match the time projected by the first clock of the first time server:

redesignating the first time server as the second time server; and redesignating the second time server as the first time server.

14. The system of claim 8, wherein gradually adjusting the second clock of the second time server is in response to a maintenance schedule indicating that the first time server should be taken offline.

15. A non-transitory computer-readable medium comprising one or more computer executable instructions that, when executed by at least one processor of a computing device, cause the computing device to perform acts comprising:

designating, within a network environment, a first time server and a second time server, wherein the first time server operates a first clock and the second time server operates a second clock and wherein one or more computing devices within the network environment are synchronized to the first clock of the first time server;

monitoring update messages between the first time server and the second time server indicating times projected by the first clock and the second clock;

determining, based on the update messages, that a difference between the times projected by the first clock and the second clock exceeds a predetermined tolerance;

in response to determining that the difference between the times exceeds the predetermined tolerance, gradually adjusting the second clock of the second time server by a predetermined amount of time in each of multiple equal time intervals within a predetermined period of time to match the time projected by the first clock of the first time server; and in response to gradually adjusting the second clock of the second time server to match the time projected by the first clock of the first time server, re-synchronizing the one or more computing devices within the network environment to the second clock of the second time server.

16. The non-transitory computer-readable medium of claim 15, wherein determining that the difference between the times projected by the first clock and the second clock exceed the predetermined tolerance comprises determining that the difference between the times projected by the first clock and the second clock is at least 50 microseconds.

17. The non-transitory computer-readable medium of claim 15, wherein the equal time intervals each comprise a predetermined number of microseconds.

18. The non-transitory computer-readable medium of claim 15, wherein monitoring the update messages between the first time server and the second time server comprises receiving the update messages from the first time server and the second time server every second.

19. The non-transitory computer-readable medium of claim 15, comprising one or more computer-executable instructions that, when executed by the at least one processor of the computing device, further cause the computing device to perform acts comprising:

designating a third time server operating a third clock;

monitoring update messages between the second time server and the third time server indicating times projected by the second clock and the third clock;

determining that a difference between the time projected by the second clock and the third clock exceed the predetermined tolerance;

in response to determining that the difference between the time projected by the second clock and the third clock exceeds the predetermined tolerance, gradually adjusting the third clock of the third time server over the predetermined period of time to match the time projected by the second clock of the second time server; and re-synchronizing the one or more computing devices within the network environment to the third clock of the third time server.

20. The non-transitory computer-readable medium of claim 19, wherein gradually adjusting the second clock of the second time server in response to a maintenance schedule indicating that the first time server will be taken offline within a threshold amount of time.

* * * * *